Dec. 29, 1931.  A. L. HARRINGTON  1,838,142
APPARATUS FOR MAKING PLATE GLASS
Original Filed May 17, 1928  4 Sheets-Sheet 1

INVENTOR
A. L. Harrington
by
James E. Bradley
atty

Dec. 29, 1931.    A. L. HARRINGTON    1,838,142
APPARATUS FOR MAKING PLATE GLASS
Original Filed May 17, 1928    4 Sheets-Sheet 2

INVENTOR
A.L.Harrington

Dec. 29, 1931.　　　A. L. HARRINGTON　　　1,838,142
APPARATUS FOR MAKING PLATE GLASS
Original Filed May 17, 1928　　　4 Sheets-Sheet 3

INVENTOR
Alfred L. Harrington
by
James C. Bradley
atty.

Patented Dec. 29, 1931

1,838,142

UNITED STATES PATENT OFFICE

ALFRED L. HARRINGTON, OF ROSSLYN FARMS, PENNSYLVANIA, ASSIGNOR TO PITTSBURGH PLATE GLASS COMPANY, A CORPORATION OF PENNSYLVANIA

APPARATUS FOR MAKING PLATE GLASS

Application filed May 17, 1928, Serial No. 278,408. Renewed April 28, 1930.

Figure 1:
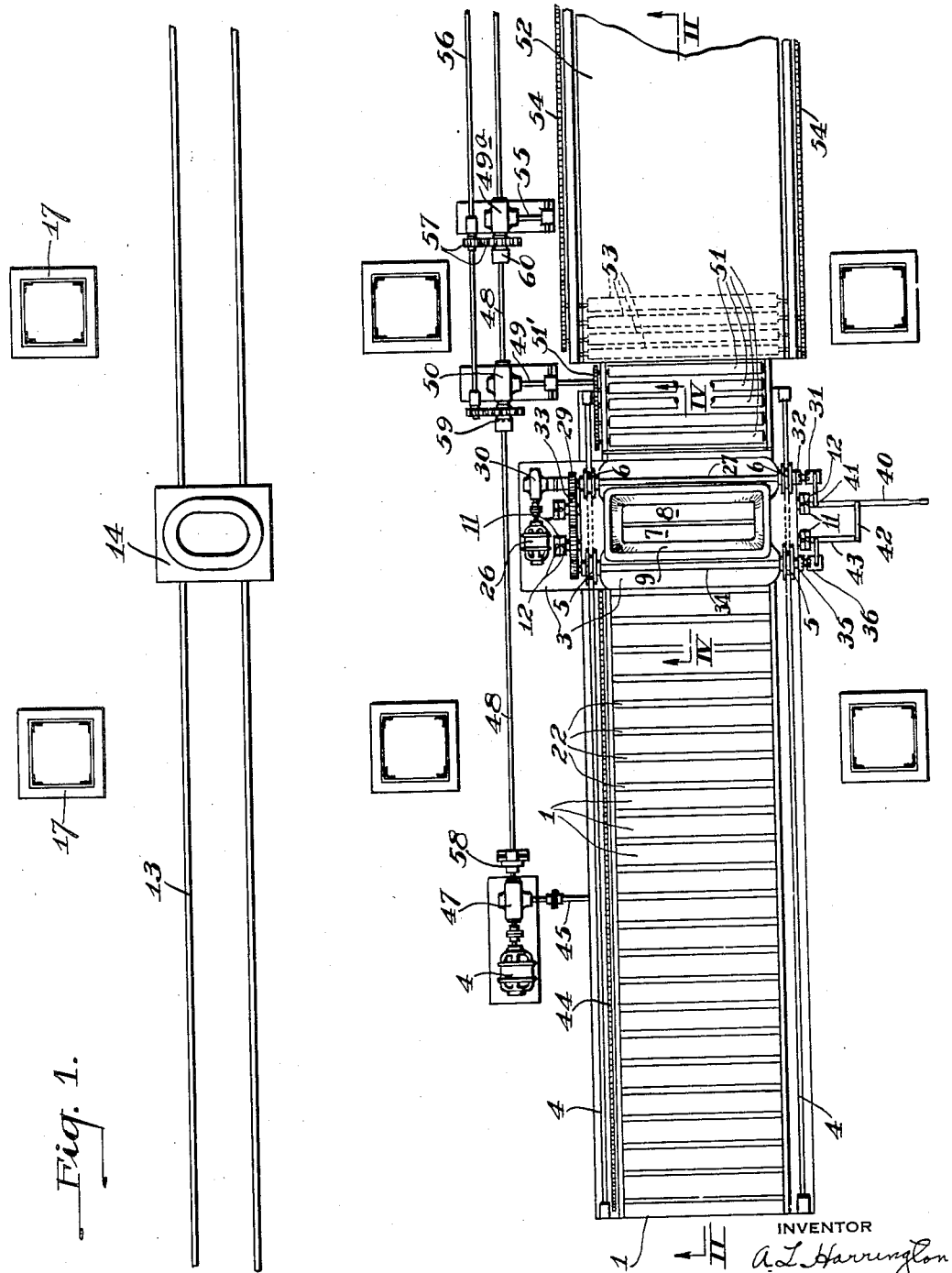
Figure 2:
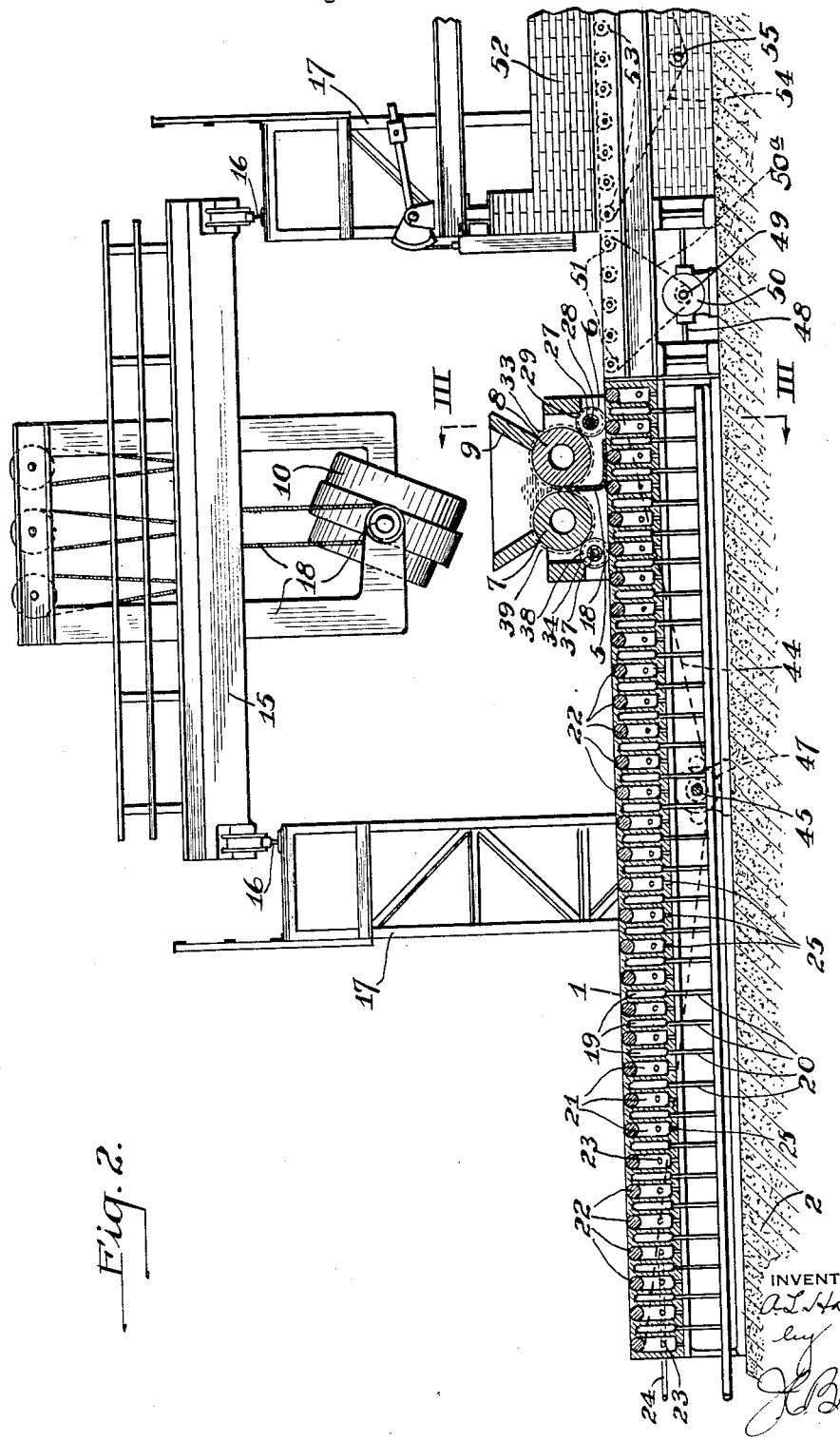
Figure 3:
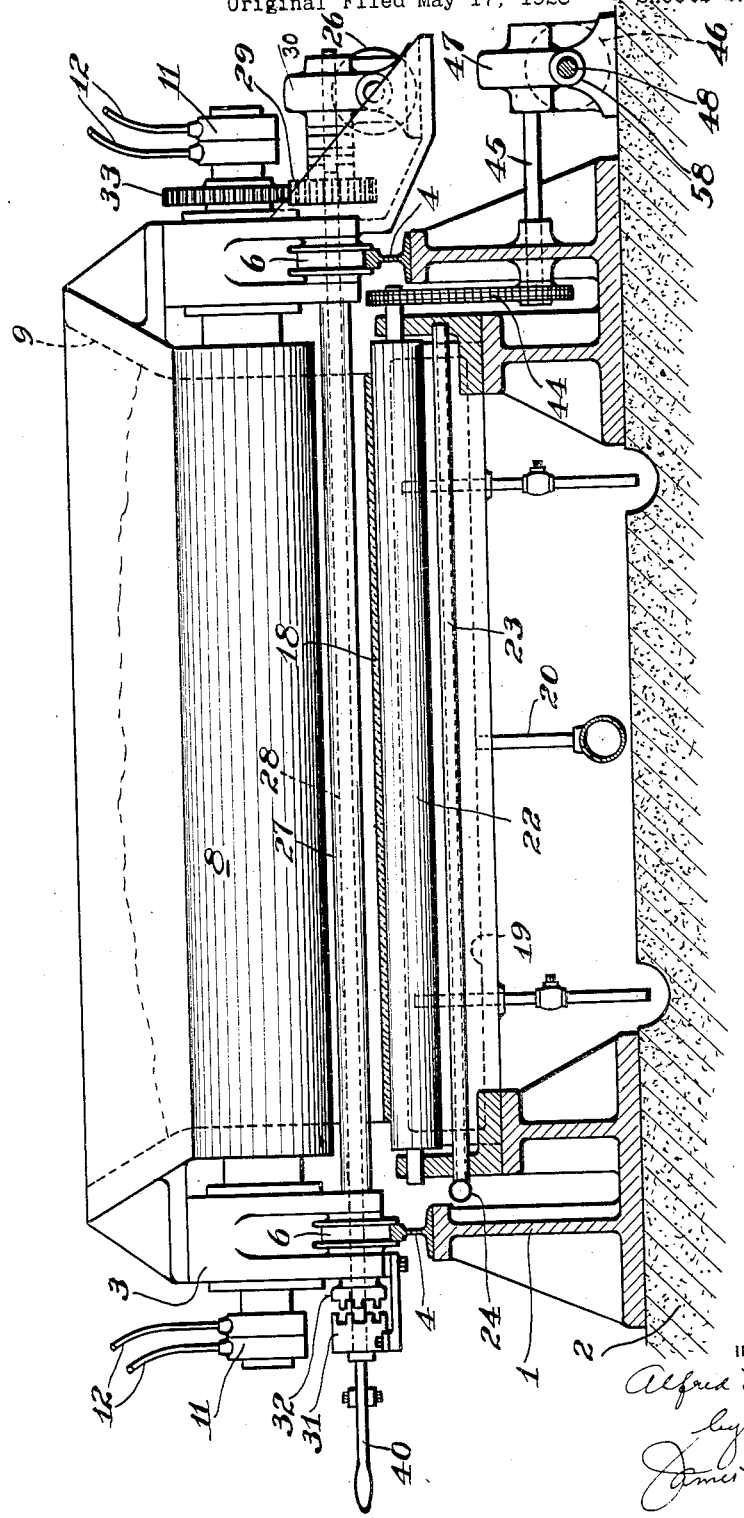
Figure 4:
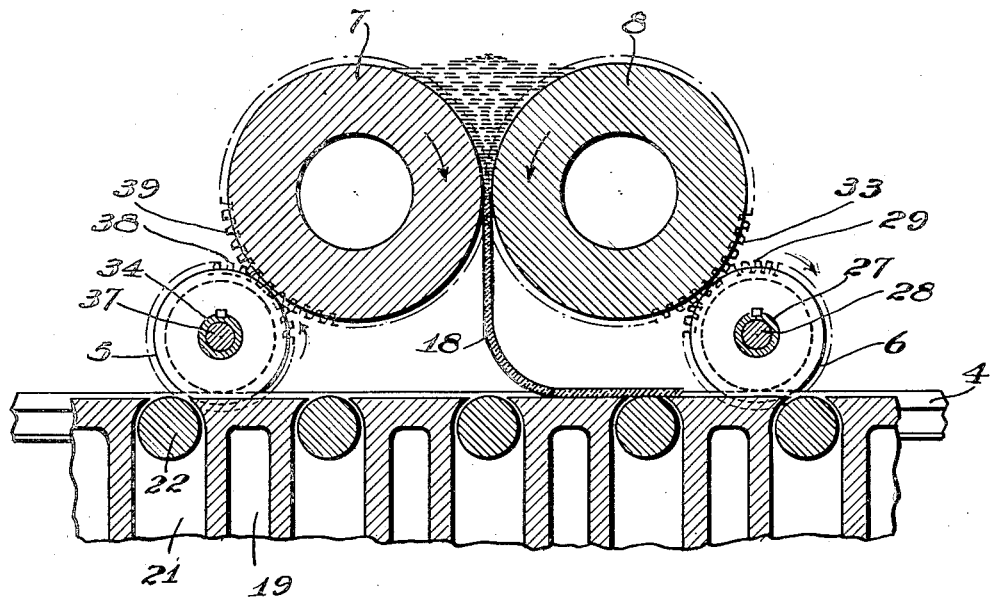

The invention relates to apparatus for making plate glass, and has for its principal objects, the provision of apparatus permitting the formation of glass sheets whose surfaces are of such smoothness that the amount of grinding is reduced to a minimum, and the provision of apparatus which permits the forming and handling of sheets which are much thinner and of more uniform thickness throughout than the sheets heretofore made using the regulation casting apparatus. One form of apparatus is illustrated in the accompanying drawings, wherein:

Figure 1 is a plan view. Fig. 2 is a section on the line II—II of Fig. 1. Fig. 3 is a section on the line III—III of Fig. 2. Fig. 4 is an enlarged detail section on the line IV—IV of Fig. 1. And Fig. 5 is an enlarged section on the line II—II of Fig. 1.

Referring to the drawings, 1 is a casting table supported upon the concrete bed 2 and 3 is a carrier or carriage mounted for movement longitudinally of the table on the rails 4, 4, the carriage being supported on two pairs of wheels 5, 5 and 6, 6. Mounted for rotation in the carriage are the sizing rolls 7 and 8 with a hopper 9 thereabove for receiving a body of molten glass from the pot 10 (Fig. 2). The rolls are provided at their ends with the swivels 11, 11, to which are connected the water pipes 12, 12 so that the rolls may be cooled by circulating water therethrough.

The pot 10 is brought to position at the side of the table on the track 13 (Fig. 1) being carried to this position from the pot furnace upon the truck 14. Mounted for movement transversely of the track 13 and of the table 1 is the crane 15 (Fig. 2), such crane being mounted upon the tracks 16 carried by the columns 17. The crane is provided with a teeming device 18 by means of which the pot is lifted from the truck 14, carried to a position over the hopper 9 and tilted to discharge the glass into the hopper. After the hopper is supplied with glass, the carriage with the two sizing rolls is moved to the left from the right hand end of the table to the left hand end thereof, the rolls being rotated during this movement so as to roll out the sheet of glass 18 and deposit it upon the table.

Figure 5:
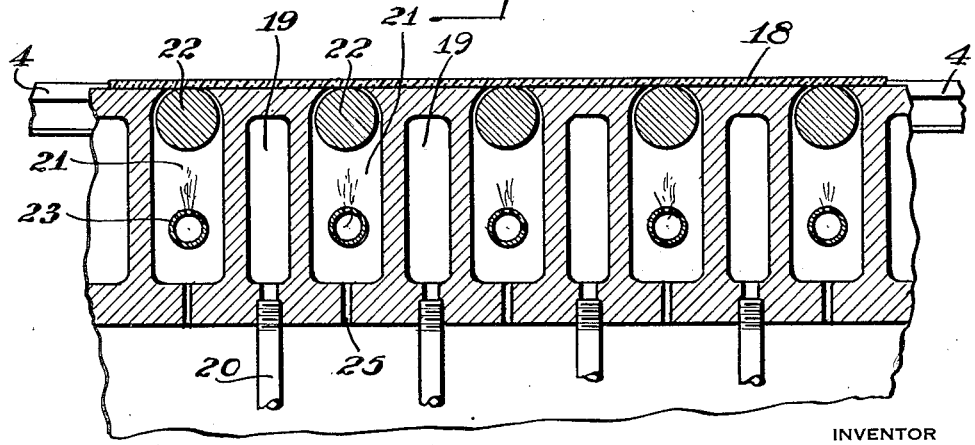

The construction of the table will be seen by reference to Figs. 4 and 5, such table preferably being of cast iron and provided at intervals with the transverse passages 19, 19, etc. connected to water pipes 20, 20, etc. so that the table may be cooled by circulating water through the passages 19 as is customary in casting tables. Interspersed between the chambers 19 are the chambers 21, 21, etc. having the rolls 22, 22, etc. mounted for rotation in their upper portions, such rolls projecting slightly above the surface of the table so that, when rotated, they will have traction upon the glass sheet 18 and be enabled to carry such sheet longitudinally of the table and onto the roller runway at the end of the table. Extending transversely of each chamber 21 is an air supply pipe 23 connected to a suitable main 24 running along the side of the table (Fig. 3). These pipes 23 are perforated and during the period in which the glass sheet 18 is being deposited upon the table, air is supplied under pressure to the chambers 21. A part of this air escapes upward around the peripheries of the rolls tending to keep them cool and to prevent the relatively plastic glass from settling down to too great an extent around the projecting surfaces of the rolls. The balance of the air escapes through outlet passages 25 at the lower side of each chamber. In this manner, the glass is prevented from sticking to the rolls and is easily moved off of the table onto the runway at the right hand end thereof after the formation of the sheet has been completed. The carriage 3 is run back and forth along the tracks 4 by means of the motor 26 which drives the tubular shaft 27 (Fig. 4), to which the wheels 6 are secured. Extending through the shaft 27 is the solid shaft 28 to which is keyed the gear 29. This shaft is driven from the motor 26 through the intermediary of worm gearing in the casing 30, the worm wheel of such gearing being carried by the shaft 28. The shaft 28 has splined to its end remote from the gear 29 the clutch member 31 adapted to engage the clutch member 32 carried upon the end of the tubular shaft 27. The gear 29 meshes with a gear 33 carried by the shaft of the roll 8. The other pair of wheels 5, 5 are keyed to a hollow shaft 34 provided at one end with a clutch member 35, this clutch member being adapted to be engaged by a clutch member 36 carried by the solid shaft 37 extending through the shaft 34. The shaft 37 has keyed thereto a gear 38 which meshes with a gear 39 mounted on the axle of the roll 7. The gears 33 and 39 engage, as indicated in Fig. 4. The two clutch members 31 and 36 are operated from the lever 40 fulcrumed at 41 (Fig. 1). A link 42 connects this lever to the bell crank lever 43 whose end engages the clutch 36. With this arrangement, the clutch member 31 is thrown into engagement when the clutch member 36 is thrown out of engagement and vice versa. When it is desired to move the carriage to the left to roll out the sheet 18 and place it upon the table, the lever 40 is operated to throw the clutch member 36 into engagement and the clutch member 31 out of engagement, the motor being driven at this time so that the gear 39 rotates in the direction indicated by the arrow in Fig. 4. This causes a rotation of the rolls 7 and 8 in the direction indicated by the arrows as well as the gear 38. Since the tubular shafts 34 and 37 are now connected by the clutch members, the shaft 34 carrying the wheels 5, 5 is rotated in the same direction as the gear 38 and the carriage moves to the left along the table rolling out the sheet and depositing such sheet upon the table. In order to return the carriage to starting position, the lever 40 is operated to move the clutch member 36 out of driving engagement and the clutch member 31 into driving engagement. The shaft 37 and the gear 38 carried thereby are now idlers, while the shaft 28 is clutched into driving engagement with the tubular shaft 27 so that the rotation of the gear 29 in the direction indicated by the arrow (Fig. 4) rotates the wheel 6, 6 in the same direction so that the carriage is moved to the right. By this arrangement, it is possible to move the carriage back and forth by merely shifting the clutches and without reversing the motor. Any other suitable means might obviously be used for accomplishing this function.

The rollers 22, 22, etc. are provided at their ends with sprockets around which passes the sprocket chain 44 and this chain is driven from a sprocket on the countershaft 45. This countershaft is driven from a motor 46 through the intermediary of reduction gearing in the casing 47. This motor also drives the line shaft 48. This line shaft is connected to a cross shaft 49 through reduction gearing in the casing 50 and this line shaft is provided with a sprocket around which passes the chain 50ª. Such chain also passes around sprockets on the ends of the runway rolls 51 onto which the glass sheet is moved after it leaves the table. The runway rolls 51 carry the glass sheet into the leer 52, such leer being of the roller type with a series of rolls 53 for receiving the glass from the rolls 51. These rolls are driven by a chain 54 passing around a sprocket on the shaft 55. The shaft 55 is driven from the line shaft 48 through the intermediary of suitable reduction gearing in the casing 49ª. The shaft 48 is continued along the leer for a considerable distance and serves to operate sets of rolls similar to the rolls 53.

It is desirable to carry the glass sheet off the table quickly and into the leer, and for this reason, the rolls 22, 51, 53, etc. are run at a relatively high speed until the sheet has been moved off of the table and gotten into the leer. It is then necessary to drop back to a proper annealing speed so that provision is made for driving the leer rolls at a relatively lower speed. This is accomplished by means of a separate line shaft 56 extending the entire length of the leer, and driven from another motor not shown. The shaft 56 is geared to the shaft 48 by means of the spur gears 57, 57 and suitable one-way clutches are provided at 58, 59 and 60 so that the shaft 48 can run ahead at high speed without interference from the shaft 56 during the first part of the operation, as above described, and so that the shaft 56 can take up the drive of the shaft 48 after the drive from the high speed motor 46 has been discontinued, the use of such clutches being a feature well-known in the art.

The foregoing arrangement permits a glass sheet to be formed between the rolls 7 and 8 at a relatively high speed and placed upon the table 1. It also permits the removal of such sheet from the table immediately and without waiting for the sheet to set or harden, since the force applied by the rolls 22, 22, etc. is uniformly distributed over the area of the plate and will not deform it. The sheet can also be moved along over the runway and leer rolls at a relatively high rate of speed until it hardens so that it will not settle between the rolls. The sheet thus produced is perfectly flat; is relatively of uniform thickness throughout; and has a relatively smooth surface as compared with glass cast in the ordinary way upon a casting table.

What I claim is:

1. Apparatus for making plate glass comprising a casting table comprising a series of flat sections spaced apart, a pair of opposing sizing rolls above the table mounted for movement longitudinally thereof, a runway in advance of the table, and driven rollers interspersed with said flat sections, and engaging the lower surface of the glass sheet which is deposited on the table from the sizing rolls, adapted to move the sheet off of the table and onto the runway.

2. Apparatus for making plate glass comprising a casting table, a pair of opposing sizing rolls above the table mounted for movement longitudinally thereof, a runway in advance of the table, a series of spaced rollers set into the top of the table with their peripheries projecting just above the upper surface of the table, fixed supporting means for the glass interspersed between the rollers and driving means for causing the rolls to rotate after a sheet of glass has been deposited on the table so as to move such sheet off of the table onto the runway.

3. Apparatus for making plate glass comprising a casting table, a pair of opposing sizing rolls above the table mounted for movement longitudinally thereof, a runway in advance of the table, a series of spaced rolls set into the top of the table with their peripheries projecting just above the upper surface of the table, means for supplying a cooling flow of air upward around the peripheries of such series of rolls, and driving means for causing the rolls to rotate after a sheet of glass has been deposited on the table so as to move such sheet off of the table onto the runway.

In testimony whereof, I have hereunto subscribed my name this 4th day of May, 1928.

ALFRED L. HARRINGTON.